United States Patent
Zhang et al.

(10) Patent No.: US 9,703,413 B2
(45) Date of Patent: Jul. 11, 2017

(54) DRIVING UNIT WITH TOUCH DETECTION AND DISPLAY FUNCTION, DRIVING CIRCUIT COMPRISING THE DRIVING UNIT, AND DRIVING METHOD

(71) Applicant: BOE Technology Group Co., Ltd., Beijing (CN)

(72) Inventors: Yuanbo Zhang, Beijing (CN); Seung Woo Han, Beijing (CN); Yun Sik Im, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 139 days.

(21) Appl. No.: 14/568,315

(22) Filed: Dec. 12, 2014

(65) Prior Publication Data

US 2016/0132170 A1    May 12, 2016

(30) Foreign Application Priority Data

Nov. 12, 2014  (CN) .......................... 2014 1 0645707

(51) Int. Cl.
  *G06F 3/045* (2006.01)
  *G06F 3/044* (2006.01)
  *G06F 3/041* (2006.01)

(52) U.S. Cl.
  CPC ............ *G06F 3/0416* (2013.01); *G06F 3/044* (2013.01); *G06F 2203/04103* (2013.01)

(58) Field of Classification Search
  CPC ............................... G06F 3/044; G06F 3/0416

(Continued)

(56) References Cited

U.S. PATENT DOCUMENTS

2006/0267653 A1\* 11/2006 Fulkerson ............ H03K 3/0375
  327/208
2007/0001727 A1\* 1/2007 Wielage ........... H03K 3/356139
  327/202

(Continued)

FOREIGN PATENT DOCUMENTS

CN    1710812 A    12/2005
CN    102375607 A   3/2012
(Continued)

OTHER PUBLICATIONS

Nov. 2, 2016—(CN) First Office Action Appn 201410645707.8 with English Tran.

*Primary Examiner* — Adam J Snyder
(74) *Attorney, Agent, or Firm* — Banner & Witcoff, Ltd.

(57) ABSTRACT

Provided are a driving unit for a touch electrode, a driving circuit, a touch panel and a driving method, wherein the driving unit comprises: a signal conversion unit configured to convert a signal input from the signal input terminal under the control of a clock signal and output the conversion result; a logic computation unit configured to perform a logic computation on the input signal and the touch enable signal and output the computation result; a buffer unit connected to an output terminal of the logic computation unit; and an output unit connected to an output terminal of the buffer unit and configured to output a touch scan signal to the touch driving electrode under the control of a signal output by the buffer unit. The driving circuit comprising multiple stages of driving unit described in the above can be directly integrated in the array substrate.

19 Claims, 8 Drawing Sheets

(58) Field of Classification Search
USPC .......................................... 345/174; 178/18.06
See application file for complete search history.

(56) References Cited

U.S. PATENT DOCUMENTS

| | | | |
|---|---|---|---|
| 2011/0096027 A1* | 4/2011 | Jeon | G06F 3/0412 345/175 |
| 2011/0221704 A1* | 9/2011 | Kurokawa | G06F 3/0416 345/175 |
| 2011/0267305 A1* | 11/2011 | Shahparnia | G06F 3/044 345/174 |
| 2012/0044166 A1* | 2/2012 | Mizuhashi | G06F 3/044 345/173 |
| 2012/0223735 A1* | 9/2012 | Gulati | H03K 19/007 326/9 |
| 2012/0262387 A1* | 10/2012 | Mizuhashi | G06F 3/044 345/173 |
| 2013/0127779 A1* | 5/2013 | Lillie | G06F 3/0416 345/174 |
| 2013/0241814 A1 | 9/2013 | Hirabayashi et al. | |
| 2014/0192019 A1* | 7/2014 | Fukushima | G06F 3/0412 345/174 |
| 2014/0292711 A1* | 10/2014 | Teranishi | G06F 3/0416 345/174 |
| 2014/0375606 A1* | 12/2014 | Abe | G06F 3/0416 345/174 |
| 2015/0049045 A1* | 2/2015 | Yousefpor | G06F 3/044 345/174 |
| 2015/0277657 A1* | 10/2015 | Azumi | G06F 3/044 345/174 |
| 2016/0170525 A1* | 6/2016 | Zhai | G06F 3/044 345/174 |

FOREIGN PATENT DOCUMENTS

| | | |
|---|---|---|
| CN | 102799306 A | 11/2012 |
| CN | 103823589 A | 5/2014 |
| CN | 204166519 U | 2/2015 |

* cited by examiner

US 9,703,413 B2

DRIVING UNIT WITH TOUCH DETECTION AND DISPLAY FUNCTION, DRIVING CIRCUIT COMPRISING THE DRIVING UNIT, AND DRIVING METHOD

This application claims priority to Chinese Patent Application No. 201410645707.8, filed on Nov. 12, 2014. The present application claims priority to and the benefit of the above-identified application and is incorporated herein in its entirety.

TECHNICAL FIELD OF THE DISCLOSURE

The present disclosure relates to the field of touch displaying, and in particular, to a driving unit for a touch electrode, a driving circuit, a touch panel comprising the driving circuit and a method for the driving circuit.

BACKGROUND

With rapid progress of display technologies, touch screens have widely merged into people's life. Currently, touch screens can be classified into an Add on Mode Touch Panel (AMTP), an On Cell Touch Panel (OCTP) and an In Cell Touch Panel (ICTP) in terms of their composition. The AMTP is a liquid crystal (LC) display screen with touch function formed by manufacturing a touch screen and a LC display screen separately and then bonding them together. However, the AMTP has disadvantages such as high manufacturing cost, low light transmission, thicker modules and so on. The ICTP integrates touch electrodes of the touch screen inside the LC display screen, thereby reducing overall thickness of the modules and reducing the manufacturing cost of the touch screen dramatically. Therefore, the ICTP is welcomed by panel manufacturers.

Currently, the capacitive ICTP has various design schemes. Typically, a touch driving electrode and a touch sensing electrode are disposed inside a LC cell to form coupling capacitance between the touch driving electrode and the touch sensing electrode. When a human body touches the touch screen, the human body electric field as formed would affect the capacitance value of the mutual capacitance, and thus change the voltage signal coupled by the touch sensing electrode. The touch position can be determined according to the change of the voltage signal. In order to implement the structural design of the above capacitive ICTP, it is usually required to arrange a corresponding touch read signal line separately for each touch sensing electrode and a corresponding touch scan signal line separately for each touch driving electrode in a Thin Film Transistor (TFT) array substrate. In order to perform touch scan for touch driving electrodes, a separate touch driving chip is typically used to directly supply touch scan signals. However, it needs a large wiring area and a number of chip pins, which is not advantageous to realize narrow bezel design of the touch screen and reduce cost.

SUMMARY

In view of the above, the present disclosure provides a driving unit for a touch electrode, a driving circuit, a touch panel comprising the driving circuit, and a driving method for the driving circuit, wherein the driving circuit for the touch electrode can be integrated in the touch panel, thereby saving panel area to facilitate narrow bezel design and reducing the cost of the touch panel.

According to an aspect of embodiments of the present disclosure, there is provided a driving unit for a touch driving electrode, comprising: a signal conversion unit with a signal input terminal, a clock input terminal and a signal output terminal, the signal conversion unit being configured to convert a signal input from the signal input terminal under the control of a clock signal input from the clock input terminal and output the conversion result; a logic computation unit whose first terminal is connected to the signal input terminal of the signal conversion unit and whose second terminal configured to receive a touch enable signal, the logic computation unit being configured to perform a logic computation on the input signal received at the first input terminal and the touch enable signal received at the second input terminal and output the computation result; a buffer unit connected to an output terminal of the logic computation unit; and an output unit connected to an output terminal of the buffer unit and configured to output a touch scan signal to the touch driving electrode under the control of a signal output by the buffer unit.

Optionally, the signal conversion unit is a latch configured to latch and output the signal input from the signal input terminal under the control of the clock signal input from the clock input terminal.

Optionally, the latch comprises: a first inverter whose input terminal is connected to the clock input terminal of the latch; a first 3-state inverter whose input terminal is connected to the signal input terminal of the latch and whose two control terminals are connected to the input terminal and an output terminal of the first inverter respectively; a second 3-state inverter whose input terminal is connected to the output terminal of the latch, whose two control terminals are connected to the two control terminals of the first 3-state inverter in an anti-parallel connection, and whose output terminal is connected to an output terminal of the first 3-state inverter; and a second inverter whose input terminal is connected to the output terminal of the second 3-state inverter and whose output terminal is connected to the output terminal of the latch.

Optionally, the latch further comprises a reset signal terminal and is configured to be reset by a reset signal input from the reset signal terminal before the touch scan of each frame starts.

Optionally, the latch further comprises: a first transistor whose gate is connected to the reset signal terminal, whose first electrode is connected to the output terminal of the first 3-state inverter and whose second electrode is connected to a source voltage.

Optionally, the logic computation unit further comprises a third input terminal connected to the clock input terminal of the signal conversion unit.

Optionally, the logic computation unit is a 3-input NAND gate.

Optionally, the signal conversion unit is a shift register unit configured to shift and output the signal input from the signal input terminal under the control of the clock signal input from the clock input terminal.

Optionally, the logic computation unit is a 2-input NAND gate.

Optionally, the shift register unit further comprises a reset signal terminal and is configured to be reset by a reset signal input from the reset signal terminal before the touch scan of each frame starts.

Optionally, the buffer unit comprises one or more inverters connected in series, the input terminal of the first inverter is connected to the output terminal of the logic computation unit and the output terminal of the last inverter is connected to the output unit.

Optionally, the output unit comprises: a first transistor whose gate is connected to the output terminal of the last inverter, whose first electrode is connected to a first signal source and whose second electrode is connected to an output node; and a second transistor whose gate is connected to the gate of the first transistor, whose first electrode is connected to a second signal source and whose second electrode is connected to the output node, wherein the output node is connected to a touch driving electrode.

Optionally, the output unit further comprises: a third transistor whose gate is connected to the input terminal of the last inverter, whose first electrode is connected to the output node and whose second electrode is connected to the first signal source; and a fourth transistor whose gate is connected to the gate of the third transistor, whose first electrode is connected to the output node and whose second electrode is connected to the second signal source.

Optionally, the first and the fourth transistors are N-type transistors, the second and the third transistors are P-type transistors, the first electrode is the source, and the second electrode is the drain.

Optionally, according to the number of the inverters comprised in the buffer unit, the first signal source is configured to output a common electrode voltage while the second signal source is configured to output a high frequency pulse signal for the touch driving electrodes to perform the touch scan; or the first signal source is configured to output the high frequency pulse signal while the second source is configured to output the common electrode voltage.

According to another embodiment, there is further provided a driving circuit for a touch panel comprising multiple stages of the driving unit as described in the above, wherein the signal input terminal of the first stage of driving unit is configured to receive a touch starting signal, the signal input terminal of respective remaining stages of driving unit is connected to the signal output terminal of the signal conversion unit in their respective previous stages of driving unit, and the output unit in respective stages of driving unit is connected to a touch driving electrode; the odd stages of driving unit are configured to receive a first clock signal, and the even stages of driving unit are configured to receive a second clock signal with inverted phase relative to the first clock signal.

According to another embodiment, there is further provided a touch panel comprising the driving circuit as described in the above.

According to another embodiment, there is further provided a method for the driving circuit as described in the above, comprising: inputting clock signals with mutually inverted phases to two adjacent stages of driving unit; inputting the touch starting signal to the first stage of driving unit, and inputting the touch enable signal to each stage of driving unit such that each stage of driving unit outputs a high frequency pulse signal to a corresponding touch driving electrode in turn until the touch scan on all touch driving electrodes is completed.

According to an example, when the driving circuit adopts the latch as its signal conversion unit, the method comprises: before the touch scan of one frame starts, the touch starting signal being at a high level, the first clock signal being at a low level, the latch of each stage of driving unit outputting a low level; the touch enable signal being at a low level, each stage of driving unit outputting a common electrode voltage; the first clock signal being changed to a high level, the latch of the first stage of driving unit outputting a high level; the touch enable signal being changed to a high level, the first stage of driving unit outputting the high frequency pulse signal to drive a first touch driving electrode; the touch enable signal being changed to a low level, the first stage of driving unit outputting the common electrode voltage; the touch starting signal being changed to a low level until the touch scan of the next frame starts, the first clock signal being changed to a low level, the latch of the first stage of driving unit entering the latched state to remain outputting a high level, the second clock signal being changed to a high level, the latch of the second stage of driving unit outputting a high level; the touch enable signal being changed to a high level, the second stage of driving unit outputting the high frequency pulse signal to drive a second touch driving electrode; with the touch enable signal being changed to a low level again, the second stage of driving unit outputting the common electrode voltage; when the next high level for the touch enable signal arrives, the next stage of driving unit outputting the high frequency pulse signal to drive a corresponding touch driving electrode until the driving for all touch driving electrodes is completed.

According to another embodiment, when the driving circuit adopts the shift register as its signal conversion unit, the method comprises: before the touch scan of one frame starts, the touch starting signal being at a high level, the first clock signal being at a high level, the shift register unit of each stage of driving unit outputting a low level; the touch enable signal being at a low level, each stage of driving unit outputting a common electrode voltage; the touch enable signal being changed to a high level, the first stage of driving unit outputting a high frequency pulse signal to drive a first touch driving electrode; the touch enable signal being changed to a low level, the first stage of driving unit outputting the common electrode voltage; the touch starting signal being changed to a low level until the touch scan of the next frame starts, the first clock signal being changed to a low level, the shift register unit of the first stage of driving unit outputting a high level; the touch enable signal being changed to a high level, the second stage of driving unit outputting the high frequency pulse signal to drive a second touch driving electrode; with the touch enable signal being changed to a low level, the second stage of driving unit outputting the common electrode voltage; and when the next high level for the touch enable signal arrives, the next stage of driving unit outputting the high frequency pulse signal to drive a corresponding touch driving electrode until the driving for all touch driving electrodes is completed.

Optionally, the touch enable signal is a periodic pulse signal whose pulse width is smaller than or equal to the pulse width of the clock signal and whose frequency is the frequency for the touch scan.

Optionally, the difference between the pulse width of the clock signal and the pulse width of the touch enable signal is adjusted to control the time for charging pixels of the touch panel.

In the driving circuit provided by embodiments of the present disclosure, when the touch scan is performed, the frequency for the touch scan is independent of the display frequency. Actually, the driving circuit and its method according to the above embodiments of the present disclosure can alternately perform the display scan and the touch scan, or perform the display scan and the touch scan separately. In addition, the driving circuit for the touch driving electrodes provided by embodiments of the present disclosure not only can satisfy the above two sequencing manners, but also can be directly integrated on the array substrate, thereby solving the issue of occupying a large wiring area on the substrate and impairing the realization of narrow bezel due to the requirement for bonding an additional touch driving chip for the touch scan signal.

BRIEF DESCRIPTION OF THE DRAWINGS

In order to describe the solutions of embodiments of the present disclosure more clearly, the figures of the embodiments are introduced briefly in the following. Obviously, the figures described in the following relate to only parts of embodiments of the present disclosure, but not limit the present disclosure.

DETAILED DESCRIPTION

In the following, the technical solutions in embodiments of the present disclosure will be clearly and completely described in connection with the drawings. Obviously, the described embodiments are parts of but not all of embodiments of the present disclosure. All other embodiments obtained by those skilled in the art based on the embodiments in the present disclosure without creative work fall into the protection scope of the present disclosure.

Currently, in order to make the capacitive touch screen have a thinner panel, the capacitive ICTP which integrates the touch electrodes inside the color filter substrate has existed, as described in the above. For example, touch driving electrodes and touch sensing electrodes are further added on the existing TFT array substrate to realize a touch function, that is, two layers of strip-like ITO (Indium Tin Oxide) electrodes crossing each other in different planes are fabricated on the surface of the TFT array substrate, wherein the two layers of ITO electrodes are taken as the touch driving electrodes and the touch sensing electrodes of the touch screen respectively, and an inductive capacitance is formed at a location where two ITO electrodes in the different planes cross each other.

Since the touch precision of the touch screen is usually in an order of millimeter while the display precision of the TFT array substrate is usually in an order of micrometer, the number of touch driving electrodes and touch sensing electrodes required by the touch screen is smaller than the number of driving lines (data lines and gate lines) required the TFT array substrate for displaying. When applying a touch scan signal on an ITO electrode as the touch driving electrode, the voltage signal coupled via the inductive capacitance is detected on the touch sensing electrode. During the process, when a human body touches the touch screen, the human body electric field would act on the inductive capacitance to change the capacitance value of the inductive capacitance and then change the voltage signal coupled by the touch sensing electrode. The touch position can be determined based on the change of the voltage signal.

Figure 1:
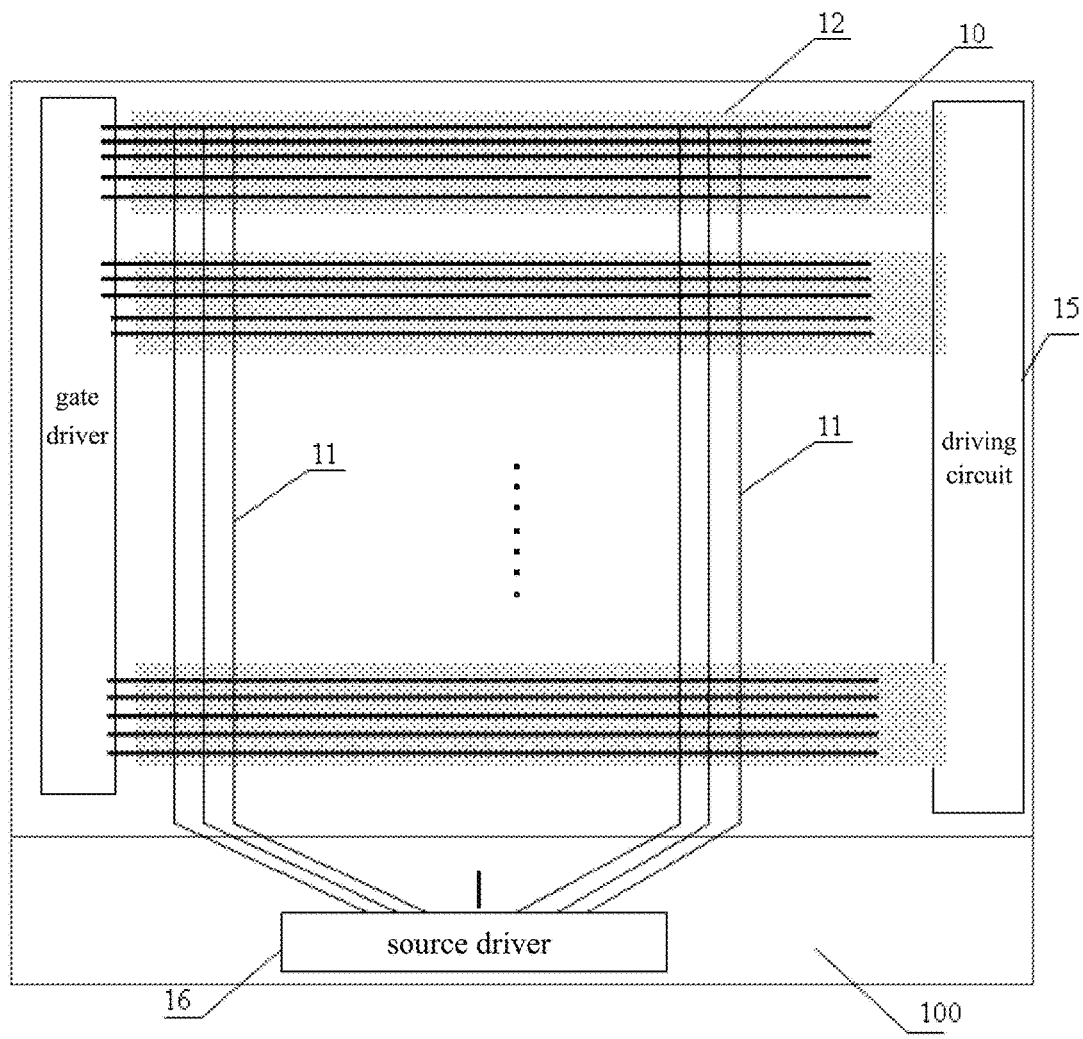
FIG. 1 is a schematic structural diagram of a touch display panel provided by an embodiment of the present disclosure.

As an example, as illustrated in FIG. 1, the touch display screen 1 comprises an array substrate 100 on which gate lines 10 arranged horizontally and data lines 11 arranged vertically cross each other. The areas where the gate lines and the data lines cross each other correspond to multiple display units (pixels). The touch driving electrodes 12 (for example, can realized by strip-like common electrodes) are parallel to gate lines. A plurality of rows of display units corresponds to one touch driving electrode. The touch driving electrodes are connected to a driving circuit 15 which can be integrated on the array substrate 100.

In the ICTP design, since the display scan and the touch scan may disturb each other, time division driving is usually used. For example, the following two time sequencing manners may exist:

a) after all pixel units are charged, i.e., after the display scan of all pixel units is completed, a time period is reserved for touch scan on all touch driving electrodes, in other words, the display scan and the touch scan are performed completely separately.

b) after a predetermined rows of pixel units are charged, a time period is reserved for touch scan on a part of the touch driving electrodes, and then another predetermined rows of pixel units are charged, followed by touch scanning on another part of the touch driving electrodes, and so on, until the display scan on all the pixel units and the touch scan on all the touch driving electrodes are completed, in other words, the display scan and the touch scan are performed alternately.

In either of the above time sequencing manners, a high frequency scan pulse needs to be output to the touch driving electrode (Tx electrode) so that the touch sensing electrode (Rx electrode) can detect the touch position so as to recognize the touch action. In the above first time sequencing manner, since the touch scan and the display scan are performed completely separately, i.e., the scan pulses are output to the touch driving electrodes after all the pixel units are charged (after the display scan), no interval is needed between the scan pulses of the touch driving electrodes. However, in the above second time sequencing manner, since the touch scan and the display scan are performed alternately, a certain time interval is needed between the scan pulses of the touch driving electrodes so as to charge the pixel units.

The driving circuit for touch electrodes according to an embodiment of the present disclosure can satisfy both the above time sequencing manners, and can be directly integrated in the array substrate, thereby solving the problem of occupying a large wiring area on the substrate and impairing the realization of narrow bezel due to the requirement for bonding a touch driving chip for the touch scan signals additionally.

Figure 2:
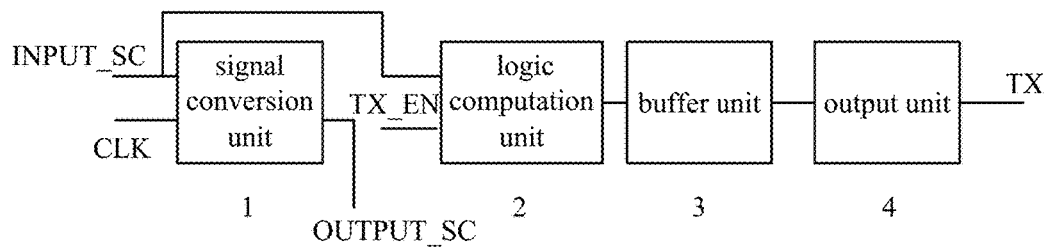
FIG. 2 is a structural block diagram of a driving unit for a touch driving electrode provided by an embodiment of the present disclosure.

According to an embodiment of the present disclosure, there is provided a driving unit for a touch driving electrode. As illustrated in FIG. 2, the driving unit comprises: a signal conversion unit 1 with a signal input terminal Input_SC, a clock input terminal CLK and a signal output terminal Output_SC, wherein the signal conversion unit 1 is configured to convert a signal input from the signal input terminal Input_SC under the control of a clock signal input from the clock input terminal CLK and output the conversion result; a logic computation unit 2 whose first terminal is connected to the signal input terminal of the signal conversion unit 1 and whose second terminal receives a touch enable signal TX_EN, the logic computation unit 2 being configured to perform logic computation on the input signal received at the first input terminal and the touch enable signal received at the second input terminal and output the computation result; a buffer unit 3 connected to an output terminal of the logic computation unit 2; and an output unit 4 connected to an output terminal of the buffer unit 3 and configured to output a touch scan signal to a touch driving electrode TX under the control of a signal output by the buffer unit 3.

Figure 3:
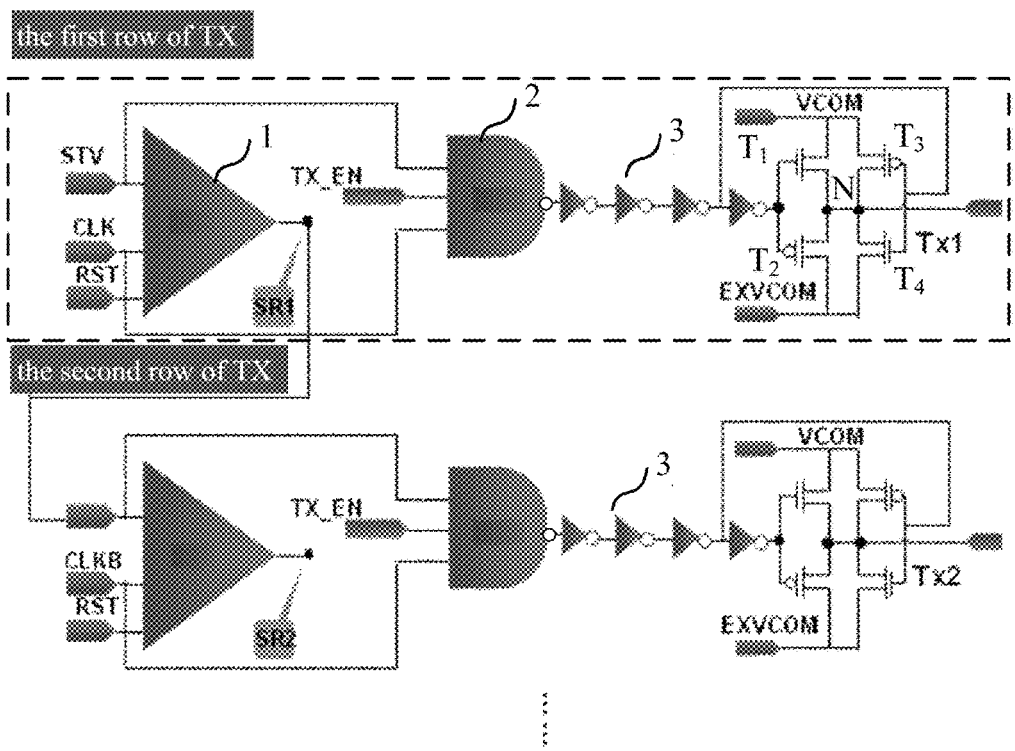
FIG. 3 is a structural block diagram of a driving circuit for touch driving electrodes provided by an embodiment of the present disclosure.

According to an embodiment of the present disclosure, as illustrated in FIG. 3, the driving unit for the touch electrode comprises a latch as the signal conversion unit 1 configured to latch and output the signal input from the signal input terminal under the control of the clock signal input from the clock input terminal. In particular, when the clock signal input from the clock input terminal is at a high level, the input signal is transferred from the signal input terminal of the latch to the output terminal of the latch, and when the input clock signal is at a low level, the previous output state is maintained. The driving unit further comprises: a 3-input NAND gate as the logic computation unit 2 whose first input terminal is connected to the signal input terminal of the latch and whose second input terminal receives the touch enable signal TX_EN, and whose third input terminal is connected to the clock input terminal of the latch, the 3-input NAND gate configured to perform logic "NAND" on the input signal received at the first input terminal, the touch enable signal TX_EN received at the second input terminal and the clock signal CLK received at the third input terminal and outputting the result; one or more inverters connected in series as the buffer unit, wherein the input terminal of the first inverter is connected to the output terminal of the 3-input NAND gate and the output terminal of the last inverter is connected to the output unit. The output unit comprises: a first transistor T1 whose gate is connected to the output terminal of the last inverter, whose first electrode is connected to a first signal source VCOM and whose second electrode is connected to an output node N; and a second transistor T2 whose gate is connected to the gate of the first transistor T1, whose first electrode is connected to a second signal source EXVCOM and whose second electrode is connected to the output node N, wherein the output node N is connected to a touch driving electrode TX, wherein the first transistor T1 is N-typed, the second transistor T2 is P-typed, the first electrode is source, the second electrode is drain, VCOM refers to the common electrode voltage required when the touch display panel displays, and EXVCOM refers to a signal source for the high frequency (tens to hundreds of KHz) pulse signals for the touch scan of the touch driving electrodes.

Alternatively, according to another embodiment of the present disclosure, the driving unit for the touch electrode comprises a shift register unit as the signal conversion unit 1 configured to shift and output the signal input from the signal input terminal under the control of the clock signal input from the clock input terminal. In particular, when the clock signal input from the clock input terminal is at a low level, the signal input from the signal input terminal is shifted by one clock pulse width and then output. The driving unit further comprises a 2-input NAND gate as the logic computation unit 2 whose first input terminal is connected to the signal input terminal of the shift register unit and whose second input terminal receives the touch enable signal TX_EN, the 2-input NAND gate configured to perform logic "NAND" on the input signal received at the first input terminal and the touch enable signal TX_EN received at the second input terminal and outputting the result; one or more inverters connected in series as the buffer unit, wherein the input terminal of the first inverter is connected to the output terminal of the 2-input NAND gate and the output terminal of the last inverter is connected to the output unit. The output unit comprises: a first transistor T1 whose gate is connected to the output terminal of the last inverter, whose first electrode is connected to a first signal source VCOM and whose second electrode is connected to an output node N; and a second transistor T2 whose gate is connected to the gate of the first transistor T1, whose first electrode is connected to a second signal source EXVCOM and whose second electrode is connected to the output node N, wherein the output node N is connected to a touch driving electrode TX, wherein the first transistor T1 is N-typed, the second transistor T2 is P-typed, the first electrode is source, the second electrode is drain, VCOM refers to the common electrode voltage required when the touch display panel displays, and EXVCOM refers to a signal source for the high frequency (tens to hundreds of KHz) pulse signals for the touch scan of the touch driving electrodes.

Figure 4:
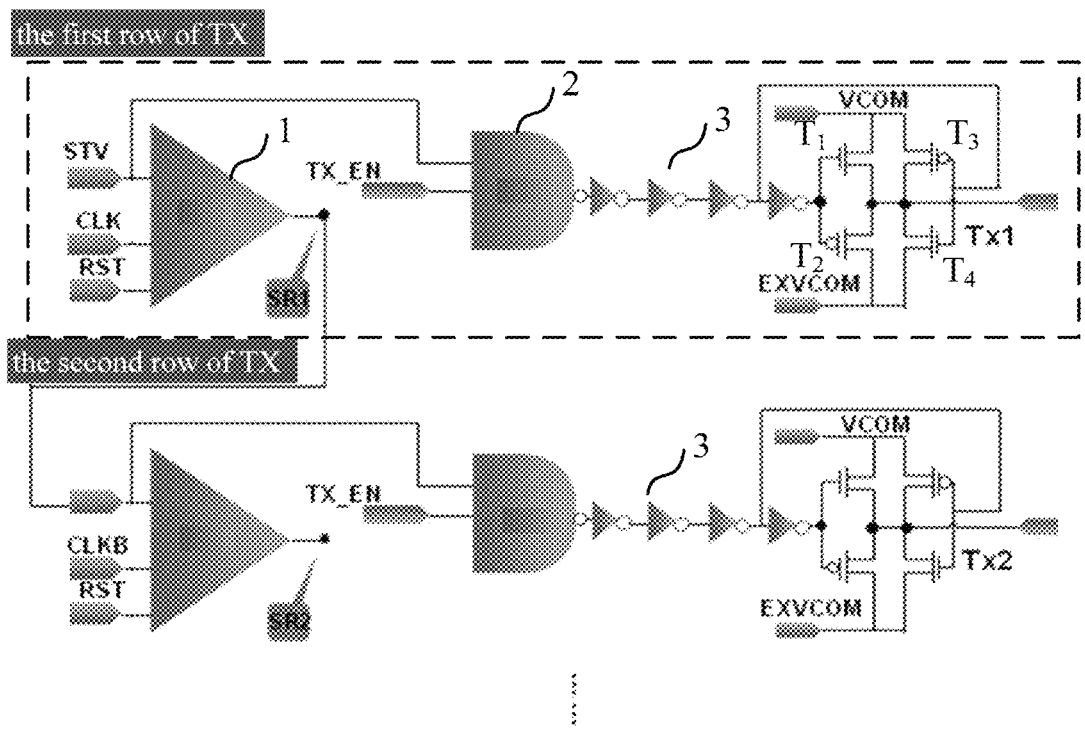
FIG. 4 is a structural block diagram of another driving circuit for touch driving electrodes provided by an embodiment of the present disclosure.

According to another embodiment of the present disclosure, as illustrated in FIG. 3 or FIG. 4, the output unit can further comprises: a third transistor T3 whose gate is connected to the input terminal of the last inverter, whose first electrode is connected to the output node N and whose second electrode is connected to the first signal source VCOM; and a fourth transistor T4 whose gate is connected to the gate of the third transistor T3, whose first electrode is connected to the output node N and whose second electrode is connected to the second signal source EXVCOM. The third transistor T3 is P-typed, the fourth transistor T4 is N-typed, the first electrode is source, and the second electrode is drain. When the output unit employs the above complementary symmetrical structure, it can reduce the adverse influence of characteristic differences between transistors on the touch driving pulses such that the output touch driving pulses have uniform performance.

According to an embodiment of the present disclosure, it is possible to configure the first signal source as the EXVCOM outputting the high frequency pulse signal and the second signal source as the VCOM outputting the common electrode voltage, as long as the number of inverters comprised in the buffer unit is correspondingly changed.

According to an example, the latch or the shift register unit in the driving unit for the touch driving electrode can further comprise a reset signal terminal and is configured to reset the latch or the shift register unit by a reset signal input from the reset signal terminal before the touch scan of each frame starts.

Figure 5:
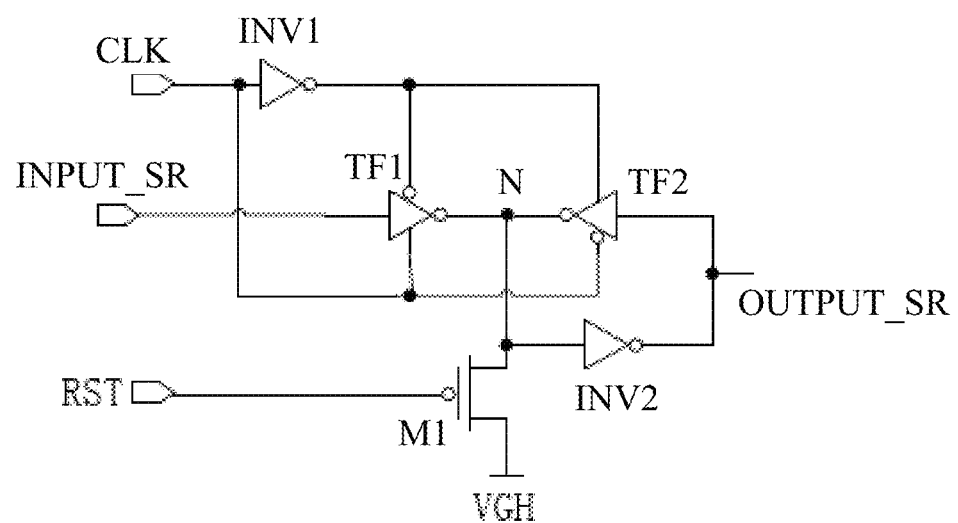
FIG. 5 is a structural block diagram of a latch adopted in the driving unit provided by an embodiment of the present disclosure.

According to an embodiment of the present disclosure, as illustrated in FIG. 5, the latch can comprise: a first inverter INV1 whose input terminal is connected to the clock input terminal CLK of the latch; a first 3-state inverter TF1 whose input terminal is connected to the signal input terminal INPUT_SR of the latch, whose two control terminals are connected to the input terminal and an output terminal of the first inverter INV1 respectively and whose output terminal is connected to the node N; a second 3-state inverter TF2 whose input terminal is connected to the output terminal OUTPUT_SR of the latch, whose two control terminals are connected to the two control terminals of the first 3-state inverter TF1 in an anti-parallel connection, and whose output terminal is connected to the node N; a reset transistor M1 whose gate is connected to the reset signal terminal RST, whose first electrode is connected to the node N and whose second electrode is connected to the source voltage VGH; and a second inverter INV2 whose input terminal is connected to the node N and whose output terminal is connected to the output terminal OUTPUT_SR of the latch, wherein the reset transistor M can be a P-type transistor.

Figure 6:
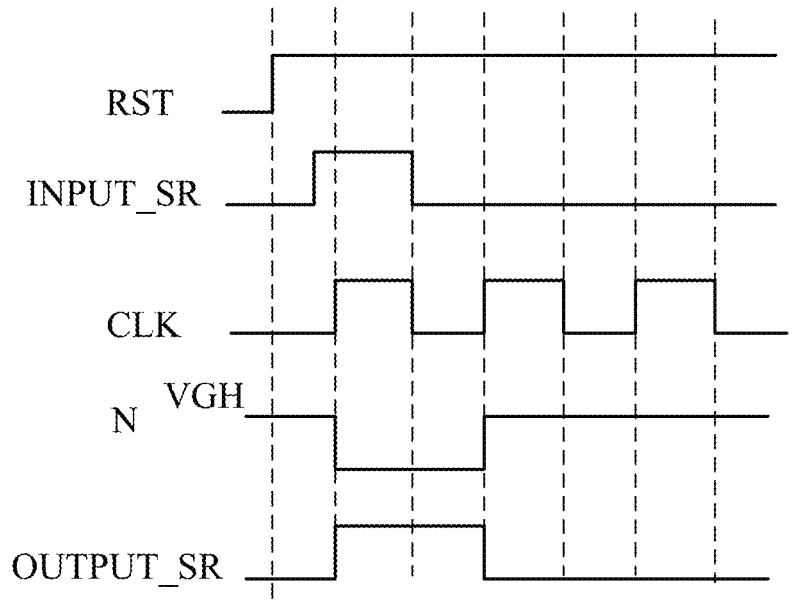
FIG. 6 is a schematic time sequence diagram applicable to the latch illustrated in FIG. 5 provided by an embodiment of the present disclosure.

According to an example, the time sequence corresponding to the above latch can be illustrated in FIG. 6. At the first phase, when the reset terminal RST of the latch is input with a low level, the reset transistor T_RST is turned on, the node N is pulled up to the source voltage VGH so that the second inverter INV2 outputs a low level, that is, the output terminal of the latch is reset; at the second phase, when the reset terminal RST of the latch is input with a high level, the reset transistor T_RST is turned off; When the signal input terminal INPUT_SR of the latch is input with a low level, and the clock signal terminal CLK is also input with a low level, the output of the first 3-state inverter TF1 is at a high impedance state and the first 3-state inverter TF1 is not turned on; the second 3-state inverter TF2 is turned on, the low level of the output terminal OUTPUT_SR of the latch is inverted and transferred to the node N so that the node N is at a high level, but the output terminal OUTPUT_SR of the latch remains at the low level; at the third stage, the signal input terminal INPUT_SR of the latch is input with a high level; since the clock signal terminal CLK continues to be input with a low level, the output of the first 3-state inverter TF1 remains in the high impedance state and the first 3-state inverter TF1 is not turned on; the second 3-state inverter TF2 continues to be ON, the low level of the output terminal OUTPUT_SR of the latch is inverted and then transferred to the node N so that the node remains at the high level, but the output terminal OUTPUT_SR of the latch remains at the low level; at the fourth phase, the clock signal terminal CLK is input with a high level, the first 3-state inverter TF1 is turn on, the second 3-state inverter TF2 is not turned on and the output of the second 3-state inverter TF2 is changed into the high-impedance state; the high level input from the signal input terminal INPUT_SR of the latch is inverted by the first 3-state inverter TF1 and then transferred to the node N so that the node N is changed to the low level; then it is inverted by the second 3-state inverter TF2, the output terminal OUTPUT_SR of the latch is changed to a high level; at the fifth phase, the signal input terminal INPUT_SR and the clock signal terminal CLK of the latch are both input with a low level, the output of the first 3-state inverter TF1 is changed into the high-impedance state and the first 3-state inverter TF1 is not turned on, and the second 3-state inverter TF2 is turned on; the high level of the output terminal OUTPUT_SR of the latch is inverted and then transferred to the node N so that the node N remains at the low level, and the output terminal OUTPUT_SR of the latch also remains at the high level to realize the latch function; at the sixth phase, the signal input terminal INPUT_SR of the latch continues to be input with a low level until the touch scan of the next frame arrives. With the arrival of the next high level input from the clock signal terminal CLK, the first 3-state inverter TF1 is turned on, the second 3-state inverter TF2 is not turned on and its output is changed to be in the high impedance state, the low level input from the signal input terminal INPUT_SR of the latch is transferred to the node N after being inverted by the turned-on first 3-state inverter TF1 so that the node N is changed to be at a high level, such that after being inverted by the second inverter INV2, the output terminal OUTPUT_SR of the latch outputs a low level; at the seventh phase, as the clock signal terminal CLK is input with a low level, the first 3-state inverter TF1 is not turned on and its output is changed to be at the high impedance state, and the second 3-state inverter TF2 is turned on; the low level of the output terminal OUTPUT_SR of the latch is inverted and then transferred to the node N so that the node remains at the high level, and the output terminal OUTPUT_SR of the latch continues to remain at the low level. Thereafter, the sixth phase and the seventh phase are repeated until the touch scan of the next frame starts.

However, as understood by those skilled in the art, the above description of internal structure and time sequence of the latch is only an example of the embodiments of the present disclosure, but not intended to limit the present invention. In practice, it is possible to employ another latch with a different internal structure and time sequence to implement embodiments of the present disclosure, as long as the latch can latch and output the signal input thereto under the control of a corresponding clock signal.

According to another embodiment of the present disclosure, there is provided a driving circuit for a touch panel, the driving circuit comprising multiple stages of driving unit for touch driving electrodes as described in the above, wherein the signal input terminal of the first stage of driving unit is configured to receive a touch starting signal, the signal input terminal of respective remaining stages of driving unit is connected to the signal output terminal of the signal conversion unit in their respective previous stages of driving unit, and the output node in respective stages of driving unit is connected to touch driving electrodes respectively; the odd stages of driving unit are configured to receive a first clock signal, and the even stages of driving unit are configured to receive a second clock signal with inverted phase relative to the first clock signal. FIG. 3 illustrates a structural block diagram of a driving circuit which employs a latch as the signal conversion unit. FIG. 4 illustrates a structural block diagram of a driving circuit which employs a shift register unit as the signal conversion unit.

According to an embodiment of the present disclosure, the above-described driving circuit for touch driving electrodes that can be integrated in the touch panel can be fabricated by low temperature poly silicon, single crystal silicon or other TFT processes. However, it is only an example of embodiments of the present disclosure, and the present disclosure is not limited to this. Those skilled in the art can also adopt other processes to integrate the driving circuit in the touch panel to save area of the touch panel and reduce its cost.

Figure 7:
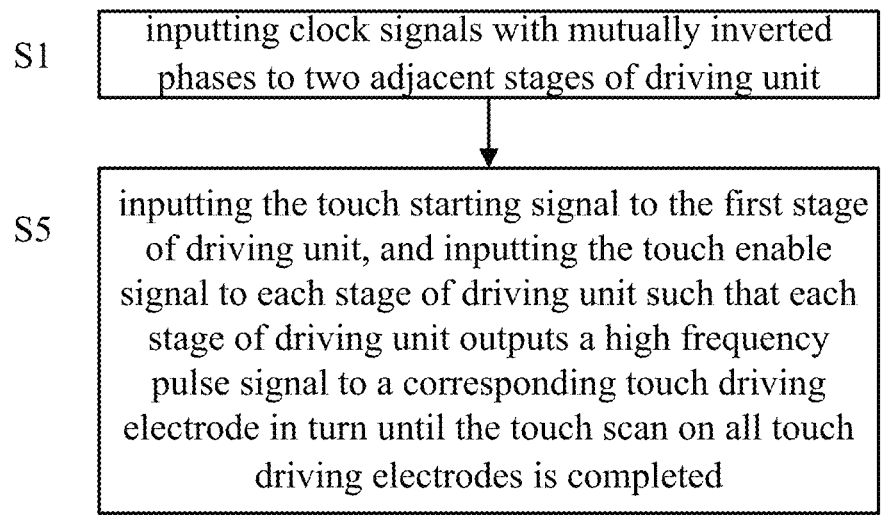
FIG. 7 is a schematic flowchart of a method for a driving circuit provided by an embodiment of the present disclosure.

According to another aspect of the present disclosure, there is provided a driving method for a driving circuit of the touch panel as described in the above. As illustrated in FIG. 7, the method comprises: a step S1 of inputting clock signals with mutually inverted phases to two adjacent stages of driving unit; a step S5 of inputting the touch starting signal to the first stage of driving unit, and inputting the touch enable signal to each stage of driving unit such that each stage of driving unit outputs a high frequency pulse signal to a corresponding touch driving electrode in turn until the touch scan on all touch driving electrodes is completed.

Figure 8:
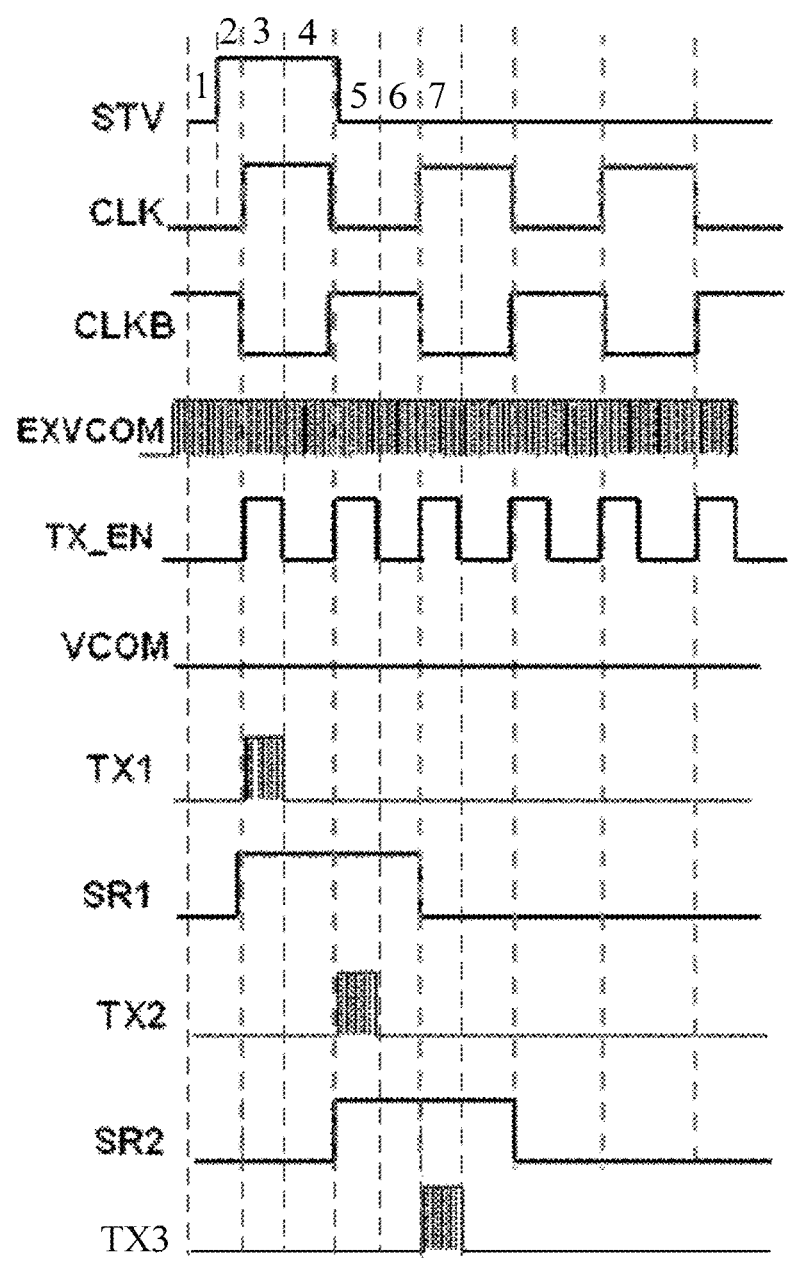
FIG. 8 is a schematic time sequence diagram of a driving circuit adopting a latch as the signal conversion unit provided by an embodiment of the present disclosure.

In the following, as illustrated in FIG. 8, the operational time sequence of the driving circuit is described in detail in connection with the principle diagram and the time sequence of the driving circuit by taking the driving circuit for the touch panel which employing a latch as its signal conversion unit as an example, as illustrated in FIG. 3.

At the first phase, before the touch scan of one frame starts, the reset signal terminal RST inputs the reset signal to each stage of driving unit in the driving circuit to reset the output of the latch of each stage of driving unit to a low level to ensure correct logic function.

At the second phase, the signal input terminal of the first stage of driving unit is input with the touch starting signal of a high level. At this point, the first clock signal CLK input to the first stage of driving unit is at a low level, and thus the latch in the first stage of driving unit (referred to as the first stage of latch hereinafter) remains at the latched state, in other words, the output of the first stage of latch remains at the low level of the reset state; the touch enable signal of each stage of driving unit is at a low level, the NAND gate as the logic computation unit outputs a high level which goes through the inverter(s) in the buffer unit and the output unit to finally output the common electrode voltage signal VCOM to each touch driving electrode.

At the third phase, the first clock signal CLK input to the first stage of driving unit is changed to a high level, the latching state of the first stage of latch is released and the signal begins to be transferred, and therefore the first stage of latch outputs a high level. The touch enable signal TX_EN is changed to a high level; therefore, the NAND gate as the logic computation unit in the first stage of driving unit (referred to as the first stage of NAND gate hereinafter) outputs a low level which goes through the inverter(s) in the buffer unit and the output unit to finally output the EXVCOM high frequency pulse signal to the first touch driving electrode so that a touch scan is performed on the first touch driving electrode.

At the fourth phase, as the touch enable signal TX_EN of the driving unit is changed to a low level, the first stage of driving unit stops outputting the EXVCOM high frequency pulse signal to the first touch driving electrode, but outputs the common electrode voltage signal VCOM.

At the fifth phase, the touch starting signal input to the signal input terminal of the first stage of driving unit is changed to a low level until the touch scan of a next frame starts, the first clock signal CLK input to the first stage of driving unit is changed to a low level, the first stage of latch enters a latched state and still outputs a high level. At this point, although the touch enable signal TX_EN is changed to a high level, because the touch starting signal is at a low level, the first stage of NAND gate remains outputting a high level which passes through the inverter(s) in the buffer unit and the output unit, and finally the common electrode voltage signal VCOM is output to the first touch driving electrode continuously.

At the same time, since the second clock signal CLKB with an inverse phase to the first clock signal CLK is changed to a high level, the signal output from the first stage of latch to the second stage of latch and the signal output to the second stage of NAND gate are at the high level, and the touch enable signal TX_EN is also at a high level, the second stage of NAND gate outputs a low level which passes through the inverter(s) in the buffer unit and the output unit, and finally the EXVCOM high frequency pulse signal is output to the second touch driving electrode so that the second touch driving electrode performs a touch scan.

At the same time, since the second clock signal is at a high level, and the input signal received by the second stage of latch is also at a high level, the second stage of latch SR2 starts to output a high level to a next stage of latch.

At the sixth phase, as the touch enable signal TX_EN is changed to a low level, the second stage of driving unit stops outputting the EXVCOM high frequency pulse signal to the second touch driving electrode but outputs the common electrode voltage signal VCOM.

At the seventh phase, the first clock signal CLK is changed to the high level again. Since the touch starting signal received by the first stage of latch is at a low level, the first stage of latch outputs a low level. Since the second clock signal CLKB is at a low level at this point, the second stage of latch enters a latched stage and remains outputting a high level. Since the first clock signal CLK and the touch enable signal are changed to a high level, and the second stage of latch outputs a high level to the third stage of NAND gate, the third stage of driving unit outputs the EXVCOM high frequency pulse signal to the third touch driving electrode Tx3 so that the third touch driving electrode performs a touch screen.

Thereafter, when a next high level for the touch enable signal arrives, a next stage of driving unit outputs the high frequency pulse signal to drive a corresponding touch driving electrode until the driving for all touch driving electrodes is completed to achieve the touch scan of one frame.

According to the above time sequence relationship, as illustrated in FIG. 8, there are equal time intervals between the high frequency pulse outputs of the respective touch driving electrodes $Tx_i$, and the pixel charging (display scan) can be carried out during such time intervals. However, if no time interval is needed, the time sequence relationship of the clock signal CLK and the touch enable signal TX_EN can be adjusted. Therefore, the frequency for the touch scan of the driving circuit is independent of the display frequency.

In other words, the driving circuit and time sequence for touch driving electrodes according to the above embodiments of the present disclosure can realize the alternate operation of the display scan and the touch scan, that is, after a predetermined rows of pixel units are charged, a time period (for example, a time period corresponding to the pulse width of the touch enable signal TX_EN) is reserved for touch scan on a part of the touch driving electrodes, and then another predetermined rows of pixel units are charged, for example, during a time period corresponding to the difference between the pulse widths of the clock signal CLK and the touch enable signal TX_EN, followed by touch scan on another part of the touch driving electrodes, and so on until the display scan on all the pixel units and the touch scan on all the touch driving electrodes are completed. In addition, the driving circuit and time sequence can also realize the completely separate operation of the display scan and the touch scan, that is, after all pixel units are charged, i.e., after the display scan of all the pixel units is completed, a time period is reserved for touch scan on all touch driving electrodes (for example, corresponding to the case in which the clock signal CLK and the touch enable signal TX_EN have the same pulse width).

Figure 9:
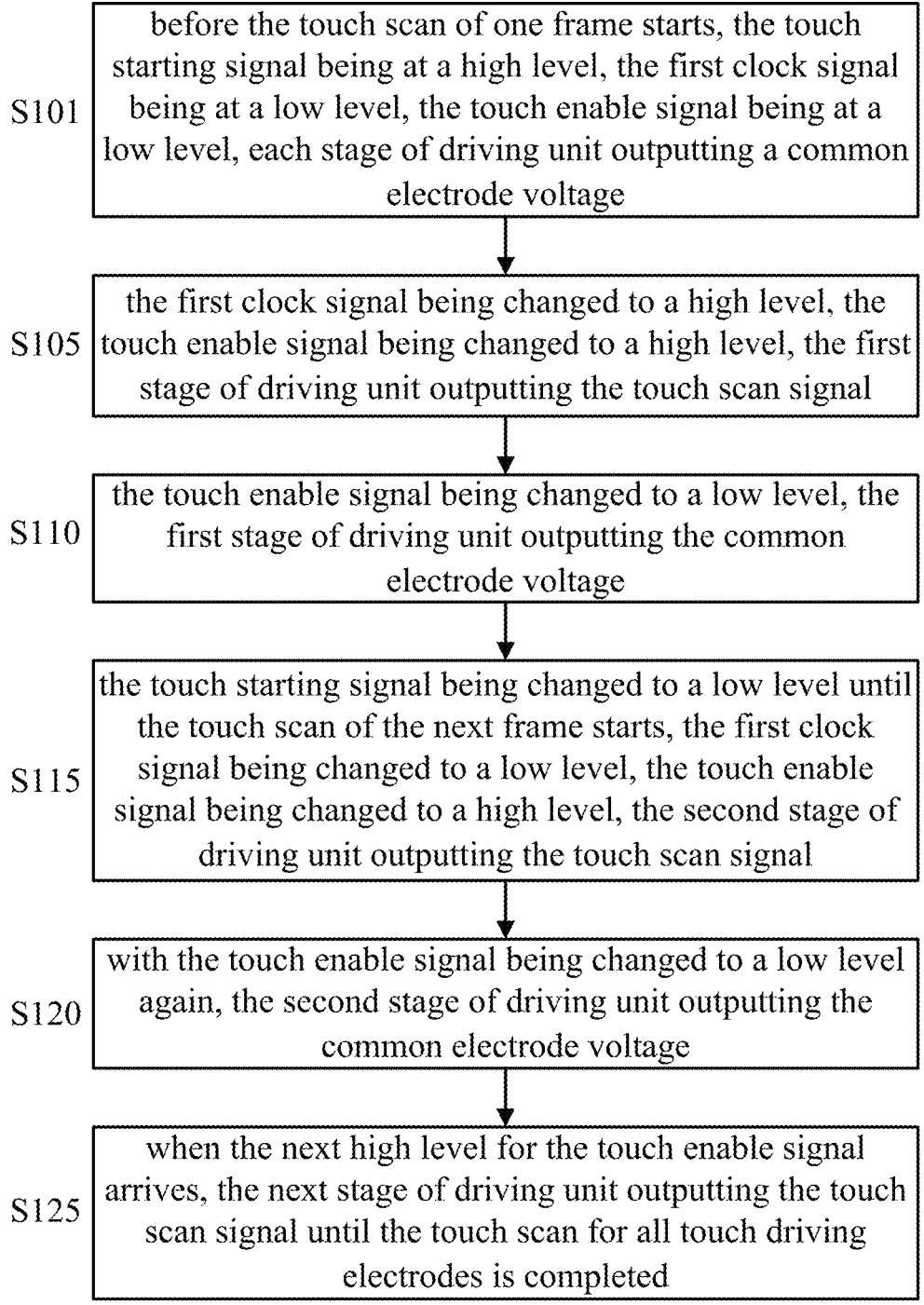
FIG. 9 is a schematic flowchart of a driving method applicable to the driving circuit illustrated in FIG. 3 provided by an embodiment of the present disclosure.

According to an embodiment of the present disclosure, when the driving circuit for the touch panel adopts the latch as its signal conversion unit, as illustrated in FIG. 9, the driving method for the above driving circuit of the touch panel can in particular comprise:

a step S101, before a touch scan of one frame starts, the touch starting signal being at a high level, the first clock signal being at a low level, the latch of each stage of driving unit outputting a low level; the touch enable signal being at a low level, each stage of driving unit outputting a common electrode voltage;

a step S105, the first clock signal being changed to a high level, the latch of the first stage of driving unit outputting a high level; the touch enable signal being changed to a high level, the first stage of driving unit outputting the high frequency pulse signal to drive a first touch driving electrode;

a step S110, the touch enable signal being changed to a low level, the first stage of driving unit outputting the common electrode voltage;

a step S115, the touch starting signal being changed to a low level until the touch scan of the next frame starts, the first clock signal being changed to a low level, the latch of the first stage of driving unit entering the latched state and still outputting a high level, the second clock signal being changed to a high level, the latch of the second stage of driving unit outputting a high level; the touch enable signal being changed to a high level, the second stage of driving unit outputting the high frequency pulse signal to drive a second touch driving electrode;

a step S120, with the touch enable signal being changed to a low level again, the second stage of driving unit outputting the common electrode voltage;

a step S125, when the next high level for the touch enable signal arrives, the next stage of driving unit outputting the high frequency pulse signal to drive a corresponding touch driving electrode until the driving for all touch driving electrodes is completed.

Figure 10:
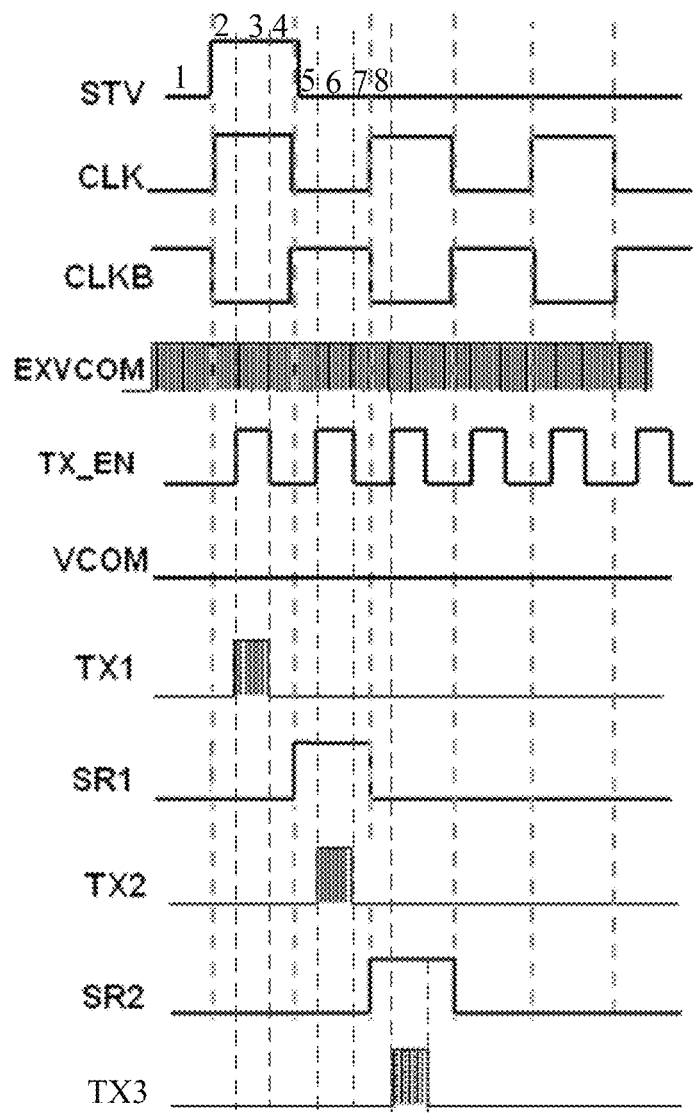
FIG. 10 is a schematic time sequence diagram of a driving circuit adopting a shift register as the signal conversion unit provided by an embodiment of the present disclosure.

According to another embodiment of the present disclosure, in the following, as illustrated in FIG. 10, the operational time sequence of the driving circuit is described in detail in connection with the principle diagram and the time sequence of the driving circuit by taking the driving circuit for the touch panel which employing a shift register unit as its signal conversion unit as an example, as illustrated in FIG. 4.

At the first phase, before the touch scan of one frame starts, the reset signal terminal RST input the reset signal to each stage of driving unit in the driving circuit to reset the output of the shift register unit of each stage of driving unit to a low level to ensure correct logic function.

At the second phase, the signal input terminal of the first stage of driving unit is input with the touch starting signal of a high level. At this point, the first clock signal CLK input to the first stage of driving unit is at a high level, and the shift register in the first stage of driving unit (referred to as the first stage of shift register hereinafter) outputs a low level, in other words, the output of the first stage of shift register remains the low level of the reset state. The touch enable signal of each stage of driving unit is at a low level, the NAND gate as the logic computation unit outputs a high level which goes through the inverter(s) in the buffer unit and the output unit, and finally the common electrode voltage signal VCOM is output to each touch driving electrode.

At the third phase, the touch enable signal TX_EN is changed to a high level; therefore, the 2-input NAND gate as the logic computation unit in the first stage of driving unit (referred to as the first stage of NAND gate hereinafter) outputs a low level which goes through the inverter(s) in the buffer unit and the output unit, and finally the EXVCOM high frequency pulse signal is output to the first touch driving electrode so that the first touch driving electrode performs a touch scan.

At the fourth phase, with the touch enable signal TX_EN of the driving unit being changed to a low level, the first stage of driving unit stops outputting the EXVCOM high frequency pulse signal to the first touch driving electrode, but outputs the common electrode voltage signal VCOM.

At the fifth phase, the touch starting signal input to the signal input terminal of the first driving unit is changed to a low level until the touch scan of the next frame starts, the first clock signal CLK input to the first stage of driving unit is changed to a low level, the output terminal of the first stage of shift register outputs the touch staring signal shifted by one CLK clock pulse width, that is, the first stage of shift register outputs a high level.

At the sixth phase, the touch enable signal TX_EN is changed to a high level, the signal output by the first stage of shift register to the second stage of shift register unit and the signal output to the second stage of NAND gate are at a high level; therefore, the second stage of NAND gate outputs a low level which passes through the inverter(s) in the buffer unit and the output unit, and finally the EXVCOM high frequency pulse signal is output to the second touch driving electrode so that the second touch driving electrode performs a touch scan.

At the seventh phase, with the touch enable signal TX_EN being changed to a low level, the second stage of driving unit stops outputting the EXVCOM high frequency pulse signal to the second touch driving electrode but outputs the common electrode voltage signal VCOM.

At the eighth phase, the first clock signal CLK is changed to the high level again, the second clock signal CLKB is changed to a low level, and the second stage of shift register outputs the touch staring signal shifted by two CLK clock pulse widths, that is, the second stage of shift register outputs a high level.

Thereafter, when the next high level for the touch enable signal arrives, the next stage of driving unit outputs the high frequency pulse signal to drive a corresponding touch driving electrode until the driving for all touch driving electrodes is completed to achieve the touch scan of one frame.

According to the above time sequence relationship, as illustrated in FIG. 10, there are equal time intervals between the high frequency pulse outputs of respective touch driving electrodes $Tx_i$, and the pixel charging (display scan) can be carried out during such time intervals. However, if no time interval is needed, the time sequence relationship of the clock signal CLK and the touch enable signal TX_EN can be adjusted. Therefore, the frequency for the touch scan of the driving circuit is independent of the display frequency.

In other words, the driving circuit and time sequence for touch driving electrodes according to the above embodiments of the present disclosure can realize the alternate operation of the display scan and the touch scan, that is, after a predetermined rows of pixel units are charged, a time period (for example, a time period corresponding to the pulse width of the touch enable signal TX_EN) is reserved for touch scan on a part of the touch driving electrodes, and then another predetermined rows of pixel units are charged, for example, during a time period corresponding to the difference between the pulse widths of the clock signal CLK and the touch enable signal TX_EN, followed by touch scan on another part of the touch driving electrodes, and so on until the display scan on all the pixel units and the touch scan on all the touch driving electrodes are completed. In addition, the driving circuit and time sequence can also realize the completely separate operation of the display scan and the touch scan, that is, after all pixel units are charged, i.e., after the display scan of all the pixel units is completed, a time period is reserved for touch scan on all touch driving electrodes (for example, corresponding to the case in which the clock signal CLK and the touch enable signal TX_EN have the same pulse width).

Figure 11:
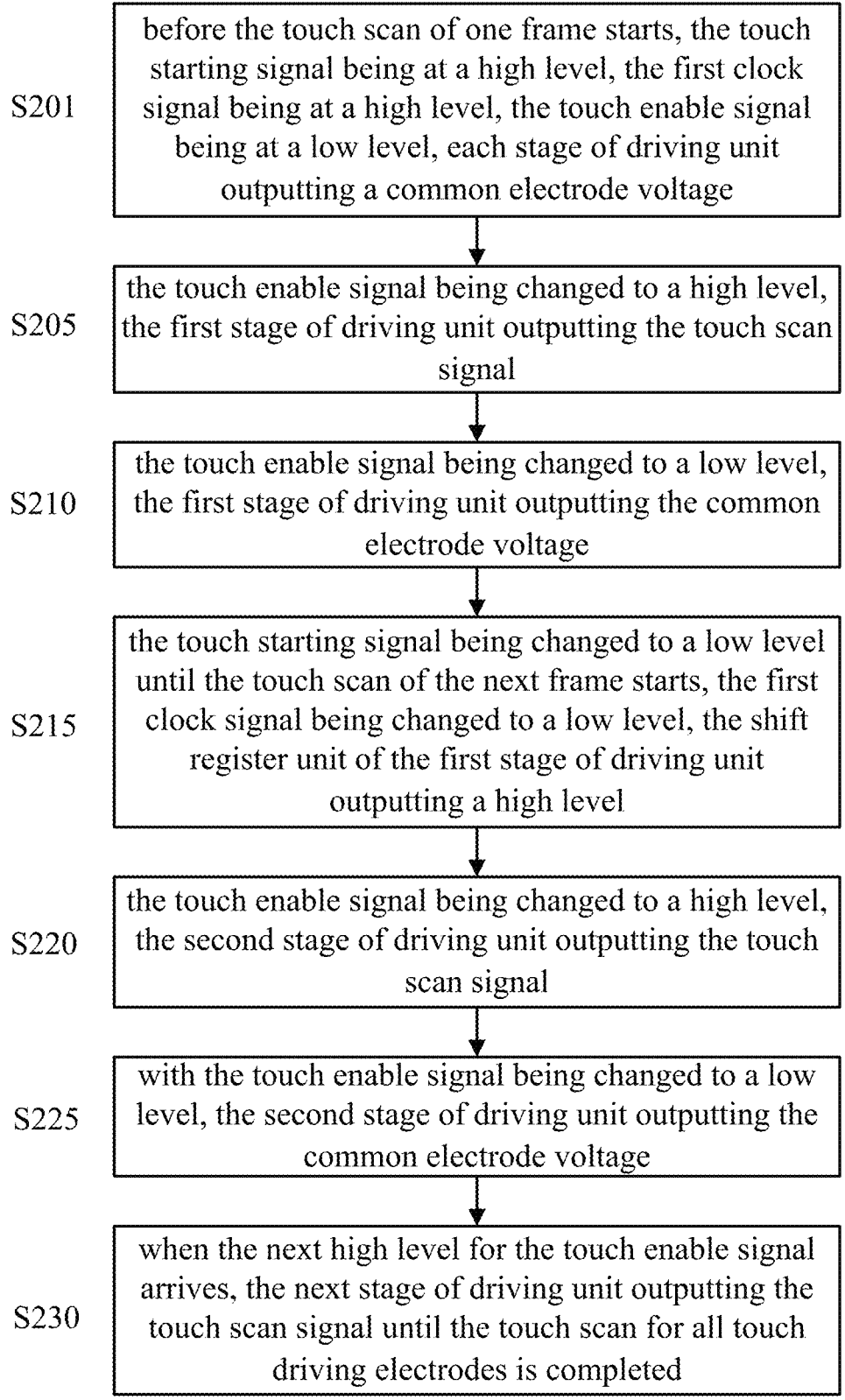
FIG. 11 is a schematic flowchart of a driving method applicable to the driving circuit of FIG. 4 provided by an embodiment of the present disclosure.

According to an embodiment of the present disclosure, when the driving circuit of the touch panel adopts a shift register as its signal conversion unit, as illustrated in FIG. 11, the driving method for the above driving circuit of the touch panel can comprise:

- a step S201, before the touch scan of one frame starts, the touch starting signal being at a high level, the first clock signal being at a high level, the shift register unit of each stage of driving unit outputting a low level; the touch enable signal being at a low level, each stage of driving unit outputting a common electrode voltage VCOM;
- a step S205, the touch enable signal being changed to a high level, the first stage of driving unit outputting a high frequency pulse signal to drive a first touch driving electrode;
- a step S210, the touch enable signal being changed to a low level, the first stage of driving unit outputting the common electrode voltage VCOM;
- a step S215, the touch starting signal being changed to a low level until the touch scan of the next frame starts, the first clock signal being changed to a low level, the shift register unit of the first stage of driving unit outputting a high level;
- a step S220, the touch enable signal being changed to a high level, the second stage of driving unit outputting the high frequency pulse signal to drive a second touch driving electrode;
- a step S225, with the touch enable signal being changed to a low level again, the second stage of driving unit outputting the common electrode voltage VCOM; and
- a step S230, when the next high level for the touch enable signal arrives, the next stage of driving unit outputting the high frequency pulse signal to drive a corresponding touch driving electrode until the driving for all touch driving electrodes is completed.

In the above, detailed description is made on the driving method for the driving circuit of the touch panel provided by embodiments of the present disclosure. However, as understood by those skilled in the art, steps of the above driving method are only for illustrating the principle of the embodiments of the present disclosure rather than limiting the scope of the present disclosure. Depending on corresponding circuit configurations and specific application scenarios, one or more steps can be combined or omitted.

Those skilled in the art can understand that all or part of the flows in the above embodiment methods can be implemented by a computer program instructing related hardware. The program can be stored in a computer readable storage medium. When the program is executed, it can comprise the flows of embodiments of the above methods. The storage medium can be a magnetic disk, an optical disk, a read only memory (ROM), a random access memory (RAM), or the like.

The above is only specific embodiments of the present disclosure, but the protection scope of the present invention is not limited to this. Those skilled in the art can easily devise various alternations or replacements within the disclosed technical scope of the embodiments of the present disclosure, which should be included within the protection scope of the present invention. Therefore, the protection scope of the present invention should be defined by the scope of the claims.

What is claimed is:

1. A stage of a driving unit in a driving circuit for touch driving electrodes, comprising:
   - a signal conversion unit with a signal input terminal, a clock input terminal and a signal output terminal, the signal conversion unit being configured to convert a signal input from the signal input terminal under a control of a clock signal input from the clock input terminal and to output a conversion result at the signal output terminal;
   - a logic computation unit having a first input terminal connected to the signal input terminal of the signal conversion unit and a second input terminal configured to receive a touch enable signal, the logic computation unit being configured to perform a logic computation on the input signal received at the first input terminal and the touch enable signal received at the second input terminal and to output a computation result;
   - a buffer unit connected to an output terminal of the logic computation unit; and
   - an output unit connected to an output terminal of the buffer unit and configured to output a touch scan signal to the touch driving electrode under a control of a signal output by the buffer unit,
   - wherein the signal conversion unit is configured to output the conversion result to a signal conversion unit of a next stage of the driving unit, and
   - wherein the clock signal of the stage of the driving unit has a phase opposite to that of the next stage of the driving unit.

2. The stage of the driving unit according to claim 1, wherein the signal conversion unit is a latch configured to latch and output the signal input from the signal input terminal under the control of the clock signal input from the clock input terminal.

3. The stage of the driving unit according to claim 2, wherein the latch comprises:
   - a first inverter having an input terminal connected to the clock input terminal of the latch;
   - a first 3-state inverter having an input terminal connected to the signal input terminal of the latch and two control terminals connected to the input terminal and an output terminal of the first inverter respectively;
   - a second 3-state inverter having an input terminal connected to the output terminal of the latch, two control terminals connected to the two control terminals of the first 3-state inverter in anti-parallel, and an output terminal connected to an output terminal of the first 3-state inverter; and
   - a second inverter having an input terminal connected to the output terminal of the second 3-state inverter and an output terminal connected to the output terminal of the latch.

4. The stage of the driving unit according to claim 3, wherein the latch further comprises a reset signal terminal and is configured to be reset by a reset signal input from the reset signal terminal before a touch scan of each frame starts.

5. The stage of the driving unit according to claim 4, wherein the latch further comprises:
   - a first transistor having a gate connected to the reset signal terminal, a first electrode connected to the output terminal of the first 3-state inverter and a second electrode connected to a source voltage.

6. The stage of the driving unit according to claim 1, wherein the logic computation unit further comprises a third input terminal connected to the clock input terminal of the signal conversion unit.

7. The stage of the driving unit according to claim 6, wherein the logic computation unit is a 3-input NAND gate.

8. The stage of the driving unit according to claim 1, wherein the signal conversion unit is a shift register unit configured to shift and output the signal input from the signal input terminal under the control of the clock signal input from the clock input terminal.

9. The stage of the driving unit according to claim 8, wherein the logic computation unit is a 2-input NAND gate.

10. The stage of the driving unit according to claim 8, wherein the shift register unit further comprises a reset signal terminal and is configured to be reset by a reset signal input from the reset signal terminal before a touch scan of each frame starts.

11. The stage of the driving unit according to claim 1, wherein the buffer unit comprises one or more inverters connected in series, an input terminal of a first inverter is connected to the output terminal of the logic computation unit and an output terminal of a last inverter is connected to the output unit.

12. The stage of the driving unit according to claim 11, wherein the output unit comprises:
    a first transistor having a gate connected to the output terminal of the last inverter, a first electrode connected to a first signal source and a second electrode connected to an output node; and
    a second transistor having a gate connected to the gate of the first transistor, a first electrode connected to a second signal source and a second electrode connected to the output node, wherein the output node is connected to a touch driving electrode.

13. The stage of the driving unit according to claim 12, wherein the output unit further comprises:
    a third transistor having a gate connected to the input terminal of the last inverter, a first electrode connected to the output node and a second electrode connected to the first signal source; and
    a fourth transistor having a gate connected to the gate of the third transistor, a first electrode connected to the output node and a second electrode connected to the second signal source.

14. A driving circuit for a touch panel comprising multiple stages of the driving unit according to claim 1, wherein the signal input terminal of a first stage of the driving unit is configured to receive a touch starting signal, the signal input terminal of respective remaining stages of the driving unit is connected to the signal output terminal of the signal conversion unit in their respective previous stages of the driving unit, and the output units in respective stages of the driving unit are connected to touch driving electrodes respectively; and
    odd stages of the driving unit are configured to receive a first clock signal, and even stages of the driving unit are configured to receive a second clock signal with an inverted phase relative to the first clock signal.

15. A method for the driving circuit according to claim 14, comprising:
    inputting clock signals with mutually inverted phases to two adjacent stages of the driving unit; and
    inputting the touch starting signal to the first stage of the driving unit, and inputting the touch enable signal to each stage of the driving unit such that each stage of the driving unit outputs a high frequency pulse signal to a corresponding touch driving electrode in turn until a touch scan on all touch driving electrodes is completed.

16. The method according to claim 15, wherein in a case in which the driving circuit adopts a latch as its signal conversion unit, the method comprises:
    before the touch scan of one frame starts, the touch starting signal being at a high level, the first clock signal being at a low level, a latch of each stage of the driving unit outputting a low level, the touch enable signal being at a low level, and each stage of the driving unit outputting a common electrode voltage;
    the first clock signal being changed to a high level, the latch of the first stage of the driving unit outputting a high level; the touch enable signal being changed to a high level, the first stage of the driving unit outputting the high frequency pulse signal to drive a first touch driving electrode;
    the touch enable signal being changed to a low level, the first stage of the driving unit outputting the common electrode voltage;
    the touch starting signal being changed to a low level until the touch scan of a next frame starts, the first clock signal being changed to a low level, the latch of the first stage of the driving unit entering a latched state to remain outputting a high level, the second clock signal being changed to a high level, the latch of a second stage of the driving unit outputting a high level; the touch enable signal being changed to a high level, the second stage of the driving unit outputting the high frequency pulse signal to drive a second touch driving electrode;
    with the touch enable signal being changed to a low level again, the second stage of the driving unit outputting the common electrode voltage; and
    when a next high level for the touch enable signal arrives, the next stage of the driving unit outputting the high frequency pulse signal to drive a corresponding touch driving electrode until the driving for all touch driving electrodes is completed.

17. The method according to claim 15, wherein in a case in which the driving circuit adopts a shift register unit as its signal conversion unit, the method comprises:
    before the touch scan of one frame starts, the touch starting signal being at a high level, the first clock signal being at a high level, the shift register unit of each stage of the driving unit outputting a low level; the touch enable signal being at a low level, each stage of the driving unit outputting a common electrode voltage;
    the touch enable signal being changed to a high level, the first stage of the driving unit outputting a high frequency pulse signal to drive a first touch driving electrode;
    the touch enable signal being changed to a low level, the first stage of the driving unit outputting the common electrode voltage;
    the touch starting signal being changed to a low level until the touch scan of a next frame starts, the first clock signal being changed to a low level, the shift register unit of the first stage of the driving unit outputting a high level;
    the touch enable signal being changed to a high level, a second stage of the driving unit outputting the high frequency pulse signal to drive a second touch driving electrode;

with the touch enable signal being changed to a low level, the second stage of the driving unit outputting the common electrode voltage; and when a next high level for the touch enable signal arrives, the next stage of the driving unit outputting the high frequency pulse signal to drive a corresponding touch driving electrode until the driving for all touch driving electrodes is completed.

18. The method according to claim 15, wherein the touch enable signal is a periodic pulse signal whose pulse width is smaller than or equal to a pulse width of the clock signal and whose frequency is a frequency for the touch scan.

19. The method according to claim 18, wherein a difference between the pulse width of the clock signal and the pulse width of the touch enable signal is adjusted to control a time period for charging pixels of the touch panel.

* * * * *